H. E. KIRSTEIN & W. E. McDONELL.
EYEGLASSES.
APPLICATION FILED SEPT. 23, 1916.

1,253,255.

Patented Jan. 15, 1918.

Inventor:
Henry E. Kirstein
William E. McDonell
by Davis & Simms
their attorneys

UNITED STATES PATENT OFFICE.

HENRY E. KIRSTEIN AND WILLIAM E. McDONELL, OF ROCHESTER, NEW YORK, ASSIGNORS TO E. KIRSTEIN SONS COMPANY, OF ROCHESTER, NEW YORK, A CORPORATION.

EYEGLASSES.

1,253,255.   Specification of Letters Patent.   Patented Jan. 15, 1918.

Application filed September 23, 1916. Serial No. 121,867.

*To all whom it may concern:*

Be it known that we, HENRY E. KIRSTEIN and WILLIAM E. McDONELL, citizens of the United States, and residents of Rochester, in the county of Monroe and State of New York, have invented certain new and useful Improvements in Eyeglasses, of which the following is a specification.

The present invention relates to eyeglasses and spectacles, and more particularly to the type in which the lenses are circular and fit in circular frames, an object of this invention being to provide a simple, efficient and inexpensive means for holding the lenses against turning in their frames.

To this and other ends, the invention consists of certain parts and combinations of parts all of which will be hereinafter described, the novel features being pointed out in the appended claims.

Figure 7:
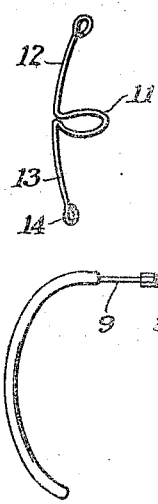
Fig. 7 is a perspective view of another embodiment of the device for preventing the turning of the lens.
Figure 1:
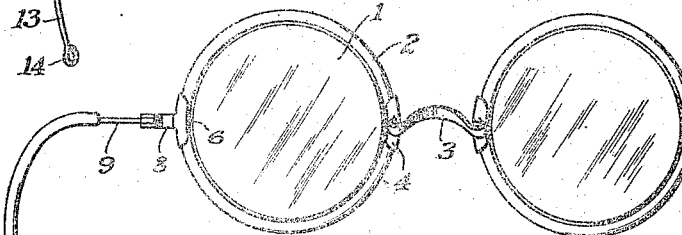
Figure 1 is a rear view of eyeglasses in which this invention is embodied.

At the present time, there is a large demand for eyeglasses in which the lenses are circular in form and are mounted in circular frames preferably made from a cellulose compound, such as celluloid. When made from a cellulose compound, the frames expand to a great extent during hot weather, thus permitting the lenses to turn and causing their proper optical relations to the eyes to be destroyed.

According to this invention, this turning of the lenses is eliminated by a device which lies in a split of the frame which surrounds the lens and projects into a notch in the lens.

Referring more particularly to the drawings, 1 indicates the lenses of the eyeglasses each surrounded by a frame 2, preferably made of a cellulose compound the two frames being connected by a bridge 3, the ends of which carry mounts 4 clamped on the frames 2 in any desired manner.

The frames 2 are split at 5 and in each of these splits a lens lock 6 is arranged, one end of the lock projecting into a notch or recess 7 formed in the periphery of the lens. The two ends of the frame on opposite sides of the split are held together in any suitable manner as, for instance, by a mount 8 for a temple 9, or the like, to bridge the split portion, said mount being clamped to the frame preferably by being bent or rolled about the frame. Projections 10 on the inner face of the mount enter into the soft material of the frame and hold the latter against movement. This arrangement also confines the lens lock 6 against lateral or sidewise movement.

Figure 6:
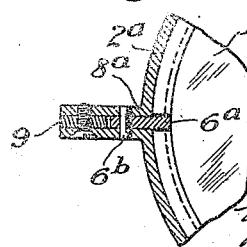
Fig. 6 is a detail view of a modification in which the ends of the split frame are turned outwardly to serve as ears for a temple.

Another manner of securing the lens lock is shown in Fig. 6 where the frame 2$^a$ is formed of metal and has its ends bent laterally at 8$^a$ to provide spaced projections for receiving the temple 9 between them. Between the ends of the frame or in the split, the lens lock 6$^a$ is arranged, a pin 6$^b$ being passed through the portions 8$^a$ and the lens lock 6$^a$ to hold the latter in place.

Figure 8:
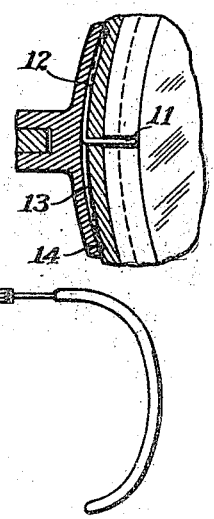
Fig. 8 is a detail sectional view showing the arrangement of the device of Fig. 7 on eyeglasses.
Figure 2:
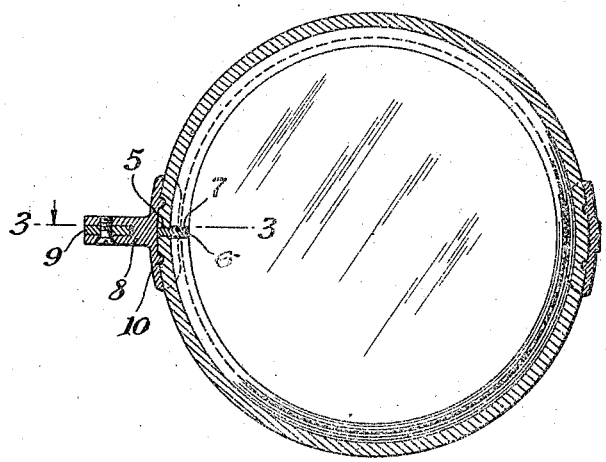
Fig. 2 is an enlarged view of one of the lenses showing its frame in section.
Figure 3:
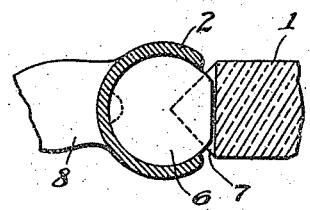
Fig. 3 is a section on the line 3—3, Fig. 2.
Figure 4:
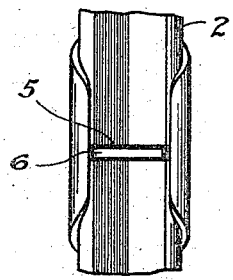
Fig. 4 is a detail view of the frame in proximity to one of the mountings to which a temple is secured.
Figure 5:
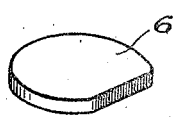
Fig. 5 is a perspective view of one of the lens locking devices.

A further modification of the lens lock is shown in Figs. 7 and 8 where the lens lock is formed from wire bent to form a central horizontal loop 11, and an upwardly and a downwardly extending arm 12 and 13 respectively. Enlargements or eyes 14 may, if desired, be formed at the ends of these arms. The situation of this lock on the mounting is shown in Fig. 8, the loop 11 lying between the ends of the split frame 2 and the arms 12 and 13 with the eyes 14 being forced into the plastic material of the frame. The eyes 14 which may be omitted, serve to lock the frame to the mounting 8 in the same manner as the projections 10 of the embodiment shown in Fig. 2.

From the foregoing, it will be seen that there has been provided a lens lock which lies in a split in the lens frame and engages within a notch in a lens to hold the latter against turning. This construction is simple, effective and inexpensive to manufacture, and it is so located that it is inconspicuous. A mount for the temple or other part serves to hold the lock in place while, at the same time, hiding the same from view.

The term "eyeglasses" is used herein in the broad sense as referring to spectacles "pince-nez" or any other glasses used for vision.

What we claim as our invention and desire to secure by Letters Patent is:

1. Eyeglasses comprising a lens formed with a notch, a split frame surrounding said lens, a separate device arranged in the split of the frame and projecting into the notch of the lens to prevent the turning of the latter, and a mounting engaging said frame on opposite sides of the split and lying on opposite sides of said lens locking device to confine the latter in the split.

2. Eyeglasses comprising a lens formed with a notch, a split frame surrounding said lens, a separate plate arranged in the split of the frame and projecting into the notch, and a mounting engaging the frame on opposite sides of the split to hold the frame together and lying on opposite sides of the plate to hold the latter in the split.

3. An eyeglass frame comprising a ring formed of non-metallic material and having a split, and a mounting for engaging said rim on opposite sides of the said split having projections adapted to enter the non-metallic rim to hold the latter to the mounting.

HENRY E. KIRSTEIN.
WILLIAM E. McDONELL.